(12) United States Patent
Nall et al.

(10) Patent No.: US 6,837,178 B1
(45) Date of Patent: Jan. 4, 2005

(54) BIRD FEEDER MOBILE

(75) Inventors: Connie Nall, 2523 S. Weaver, Springfield, MO (US) 65807; Dorothy Turner, deceased, HC 1, Box 1100, late of Tecumseh, MO (US), 65760; by Dwayne Turner, legal representative, HC 1, Box 1100, Tecumseh, MO (US), 65760

(73) Assignees: Connie Nall, Springfield, MO (US); part interest; Dorothy Turner, Tecumseh, MO (US); part interest ( * ) Notice: Subject to any disclaimer, the term of this patent is extended or adjusted under 35 U.S.C. 154(b) by 0 days.

(21) Appl. No.: 10/364,913

(22) Filed: Feb. 11, 2003

Related U.S. Application Data

(63) Continuation-in-part of application No. 10/062,478, filed on Feb. 4, 2002, now abandoned, which is a continuation of application No. 09/603,373, filed on Jun. 26, 2000, now abandoned.
(60) Provisional application No. 60/141,014, filed on Jun. 29, 1999.

(51) Int. Cl.⁷ .............................................. A01K 61/02
(52) U.S. Cl. .................................................. 119/57.8
(58) Field of Search ........................... 119/57.8, 51.01, 119/52.3, 51.03; 40/455; D11/141

(56) References Cited

U.S. PATENT DOCUMENTS

| | | | |
|---|---|---|---|
| 2,487,087 A | 11/1949 | Anderson | 119/52.2 |
| 2,769,276 A | 11/1956 | Steiner | |
| D189,821 S | 2/1961 | Lyon | D25/1 |
| 2,994,156 A | 8/1961 | Steiner et al. | |
| 3,564,759 A | 2/1971 | Buttermore | 248/104 |
| 3,876,080 A | 4/1975 | Hultberg et al. | 211/105.5 |
| 3,911,866 A | 10/1975 | Dodd | 119/26 |
| D259,478 S | 6/1981 | Schoch | D11/141 |
| 4,637,941 A | 1/1987 | Rochte | 428/8 |
| 4,640,034 A | 2/1987 | Zisholtz | 40/455 |
| 4,767,088 A | 8/1988 | Fielder et al. | 248/121 |
| 4,986,219 A | 1/1991 | Harris | 119/57.8 |
| 5,165,364 A | 11/1992 | Horkey | 119/57.8 |
| D336,495 S | 6/1993 | Raiffe et al. | D21/63 |
| 5,215,040 A | 6/1993 | Lemley | 119/52.3 |
| 5,255,631 A | 10/1993 | Anderson | 119/52.2 |
| 5,634,429 A | 6/1997 | Loomis et al. | 119/52.2 |
| 5,699,752 A | 12/1997 | Wilkins | 119/51.03 |
| 5,791,775 A | 8/1998 | Douglass, II | 362/806 |
| 5,868,101 A | 2/1999 | Marshall | 119/428 |
| 5,996,127 A | 12/1999 | Leslie | 119/715 |
| 6,269,771 B1 | 8/2001 | Cotter | 119/57.9 |
| 6,325,019 B1 | 12/2001 | Taber | 119/63 |

FOREIGN PATENT DOCUMENTS

GB           2127266 A      4/1984

Primary Examiner—Michael J. Carone
Assistant Examiner—Jordan Lofdahl
(74) Attorney, Agent, or Firm—Jonathan A. Bay

(57) ABSTRACT

A bird feeder apparatus comprising a structure having a substantially vertical axis of rotation about which the structure is mounted for free rotation in a horizontal plane. The bird feeder tray is carried by the structure to pivot relative thereto at several locations about the axis, whereby the bird feed in the tray remains presented upwardly as the structure rises, falls, pitches, rolls, pivots, swings and sways in response to bird weight application to the tray or bird leverage arms.

6 Claims, 3 Drawing Sheets

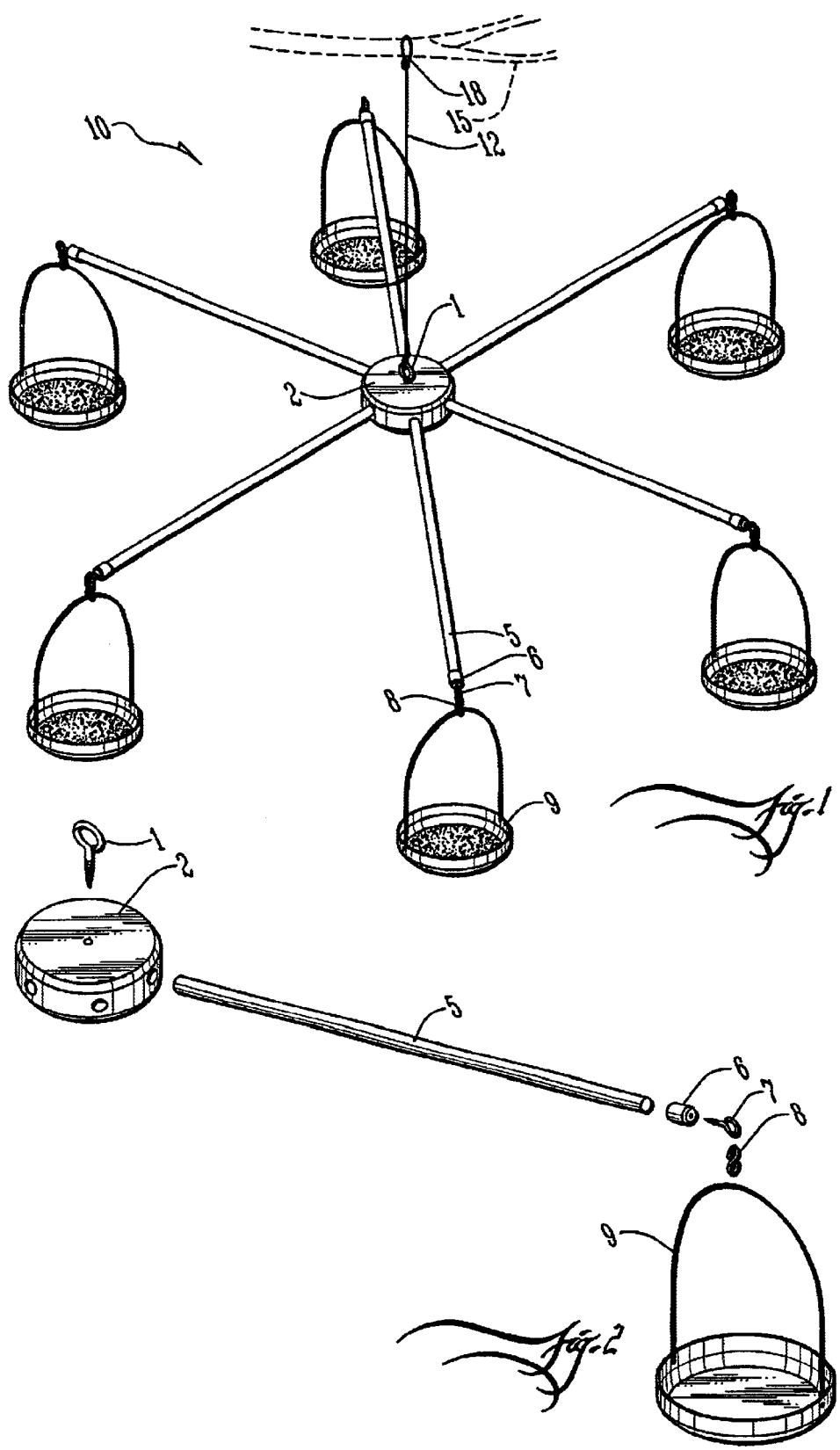

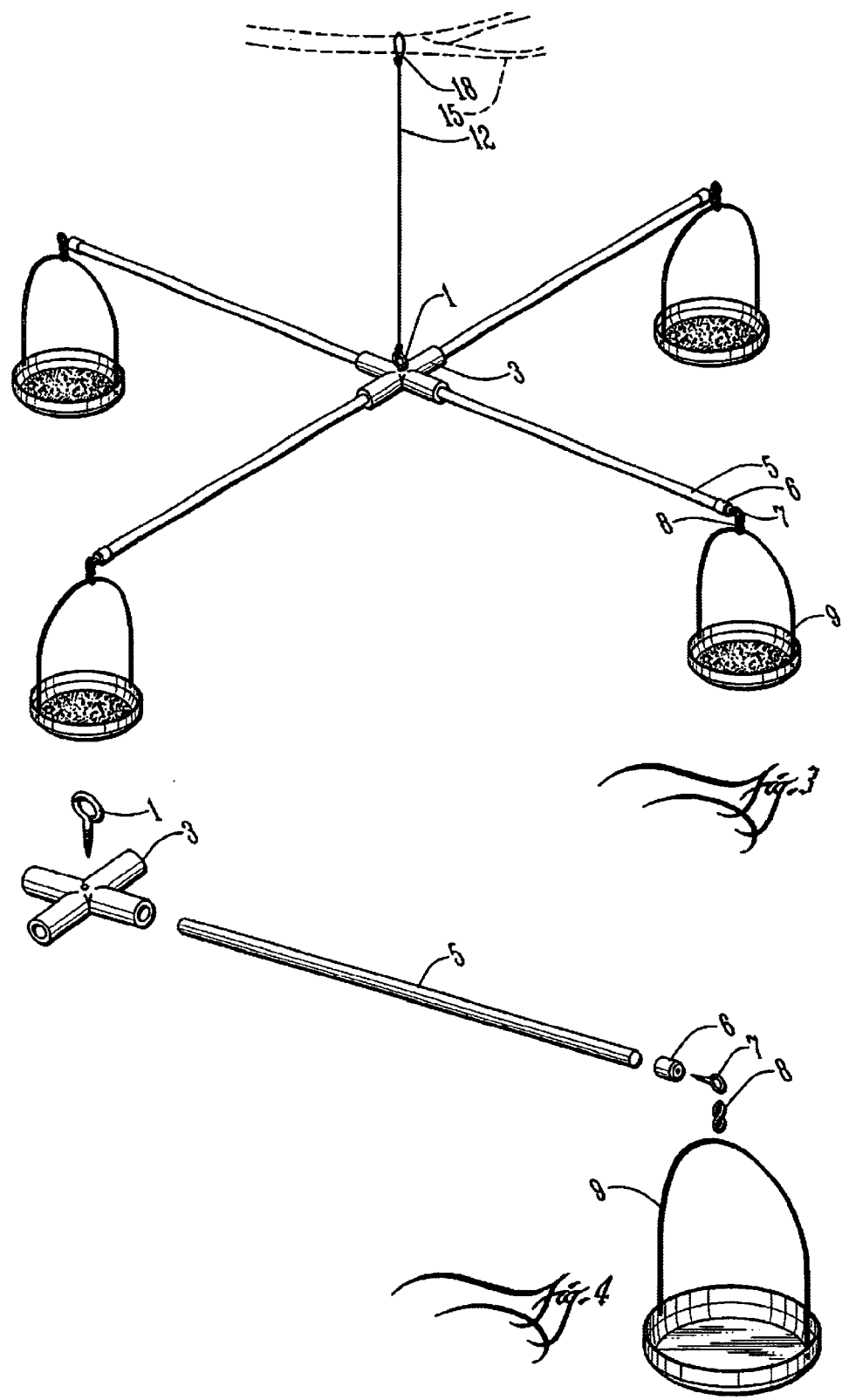

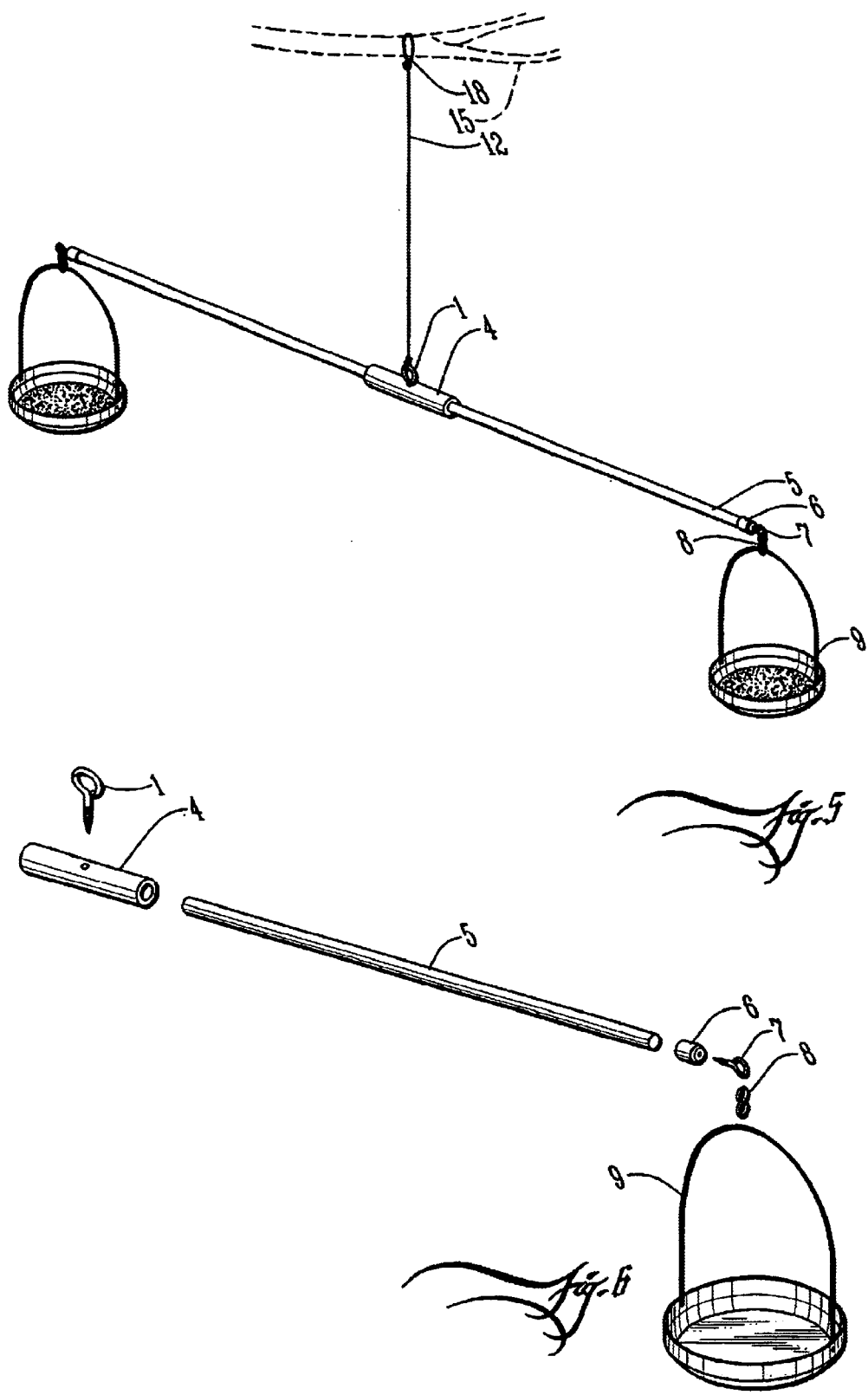

BIRD FEEDER MOBILE

CROSS-REFERENCE TO RELATED APPLICATION(s)

This application is a continuation-in-part of U.S. patent application Ser. No. 10/062,478, filed Feb. 4, 2002, now abandoned which is a is a continuation of U.S. patent application Ser. No. 09/603,373, filed Jun. 26, 2000, now abandoned and both being incorporated herein by reference.

This application incorporates by reference the disclosure of U.S. Provisional Application No. 60/141,014, filed Jun. 29, 1999.

BACKGROUND OF THE INVENTION

The invention relates to bird feeders, and more particularly to a bird feeder constructed as a form of kinetic art such as more commonly referred to as a mobile. Briefly, a mobile is usually a suspended structure having a spidery construction made of objects hung on vertical strings from various points on horizontal arms. Typically the structure is delicately balanced and capable of free movement for sensitivity to breezes or light touch, which in consequence sets the arms and objects into a lazy motion.

The foregoing differs with the bird feeder in accordance with the invention because delicate balance is not paramount. The inventive bird feeder provides a wild carnival ride for the birds that feed from it, despite utilizing a balance/counter-balance principle where as few as two or more feed trays (or baskets or tubes which work equally as well for feed containers) are connected to a bird feeder apparatus which allows the weight of the birds to cause the feed trays to rise, fall, pivot, rotate, swing and sway. All this creates a festive atmosphere when birds are feeding which the birds seem to enjoy, and brings enjoyment to bird watchers.

Bird feeders in general have fixed positions whereby the only observable movement is attributable to birds flying toward and away from the feeder or moving at feeder trays. There is a need for a colorful feeder apparatus which brings a new dimension to bird feeding and bird watching, which imparts further observable movement to birds and the feeder and which has an attractive range of movement even when birds are not on the feeder. That is, any breeze causes movement to the feeder even in the absence of visits from birds. Additionally, there is a need for a feeder apparatus that allows a larger number of birds to feed at the same time. There is also need for movable feeder means holding a relatively large amount of bird feed.

SUMMARY OF THE INVENTION

It is an object of the invention to provide simple effective, low-cost, bird-weight driven apparatus meeting the above need(s).

A further object is to provide a bird feeder apparatus with carrier means on the end of each bird leverage arm for supporting the individual feeder trays to pivot about vertical carrier axis generally normal to the plane.

These and other aspects and objects are provided according to the invention in a feeder apparatus comprising at least two bird leverage arms and as many as six or more bird leverage arms wherein six are preferred. The bird feeder apparatus hangs substantially horizontal to the ground when birds are not feeding. There are bird feeder trays or tray means carried by the bird leverage arms to pivot relative thereto at a minimum of two to multiple locations about the bird feeder apparatus. In consequence thereof, the bird feed in the tray means remains presented upwardly as the bird feeder apparatus rises, falls, rotates, rolls, pivots, swings, and sways in response to bird weight application to the tray means or the bird leverage arms.

Given the foregoing, the feed trays may typically and advantageously project at the end of each bird leverage arm affording a great deal of feed storage space, which is openly presented for observation as the tray means and bird leverage arms move in response to birds perching on the different tray means and different bird leverage arms. Birds imposing weight on any tray or bird leverage arm cause a balance/counter-balance movement. In this regard, tray connector means if typically carried by the bird leverage arms and supporting the trays to freely pivot so that near vertical axis projecting generally normal to the plane, whereby the trays and bird feed therein remain presented upright as the bird leverage arms rise, fall, rotate, roll, pivot, swing, and sway.

As previously mentioned, a further object of the invention is to provide a bird feeder apparatus with carrier means on the end of each bird leverage arm for supporting the individual feeder trays or tray means to pivot about vertical carrier axis generally normal to the plane. As such, the feeder trays or tray means associated with the carrier means generally remain below the levels of the carrier axis.

In alternative phraseology, the foregoing objects in accordance with the invention are provided a feeder apparatus comprising various aspects of the following. That is, the bird feeding apparatus preferably is provided with a suspension line that extends between an upper attachment point and a spaced lower connection point. The upper attachment point is adapted for attaching to an overhead support. A sprocket or coupler and the like is included and attached to the lower connection point to freely suspend therefrom.

There are a plurality of cantilevered arms extending from origins secured in the sprocket to outward feeder-hang points. Optionally the "outward" feeder-hang points may be the very extreme ends or terminations of the arms. Preferably the arms are produced from relatively rigid stock materials as opposed to the suspension line. These arms and sprocket can be reckoned as arranged to form a sprocket-and-spoke structure. As such, the sprocket-and-spoke structure hangs from the suspension line such that in some instances it may be almost horizontal. More often than not, sprocket-and-spoke is more likely to be in motion on the suspension line as by rotating about an axis of rotation defined through the lower connection point, or alternatively by swinging or swaying or else doing some combination of hanging horizontally, rotating, swinging or swaying. Observations show that, given the foregoing, any light breeze will impart motion even without any visitation by birds or other external force.

In addition, there is a corresponding or at least another plurality of feeder units for the plurality of arms. The feeder units are arranged to be suspended from respective ones of the feeder-hang points. Therefore, if given bird-weight application to any of the feeder units or arms, then in response the sprocket-and-spoke structure goes into motion. This causes the feeder units to variously rise, fill, pitch, roll, pivot, swing or sway or do combinations thereof, and which in consequence apparently provides a scene appearing to be one of a festive atmosphere for the amusement of bird watchers as well as a scene which even the birds seem to enjoy. As mentioned, this bird feeder apparatus also has an attractive movement at times even without birds because of motion imposed by breezes.

The foregoing plurality of arms can be varied among assorted configurations including for example and without limitation to number or arrangement, two oppositely-spaced apart arms, four evenly-spaced apart arms, or six evenly-spaced apart arms. Optionally the feeder units comprise any of trays, baskets or tubes. One non-limiting example way of accomplishing suspension or hanging of the feeder units is by means of bails. Preferably the suspension line is produced from any of string, fishing line, or chain and the like.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a bird feeder apparatus in accordance with the invention wherein a six arm configuration (in contrast to two, four and so on) is shown for non-limiting illustrative purposes only;

FIG. 2 is a fragmented perspective view of the bird feeder apparatus of FIG. 1 showing how easily the apparatus using six bird leverage arms can be assembled;

FIG. 3 is a perspective view of an alternate embodiment of the bird feeder apparatus in accordance with the invention except configured with four bird leverage arms for illustrative purposes only;

FIG. 4 is a fragmented perspective view of the bird feeder apparatus of FIG. 3 showing how easily the apparatus using four bird leverage arms can be assembled;

FIG. 5 is a perspective view of a further embodiment of the bird feeder apparatus in accordance with the invention except configured with two bird leverage arms for illustrative purposes only; and FIG. 6 is a fragmented perspective view of the bird feeder apparatus of FIG. 5 showing how easily the apparatus using two bird leverage arms can be assembled.

DETAILED DESCRIPTION OF THE PREFERRED EMBODIMENTS

The view of FIG. 1 and fragmented view FIG. 2 show one version of a bird feeder 10 in accordance with the invention. The bird feeder 10 has a sprocket or hub 2 functioning as an arm-base or -holder for arms 5 and is formed with six precision drilled holes along outside edge and one pre-drilled hole in the center. The arm-holder 2 is provided with a line-attachment fixture like eye-bolt 1 or the like. This line-attachment fixture (eg., eye-bolt) 1 is slid thru the center hole in the sprocket 2 and braised in place. The origin-ends of the bird leverage arms 5 are slid into the sprocket 2 and glued in place. A feed-tray attachment fixture 7 for the feed trays 9, such as eye-bolt 7, is slid thru a pre-drilled hole in a feed-tray holder cap 6 and braised to inside of the feed-tray holder cap 6. The feed-tray holder cap 6 is then slid over the outer end of the respective bird leverage arm 5 and glued in place. The feed-tray attachment fixture 7 is then coupled with feed tray connector 8, which for example can comprise an S-hook. Bail of feed tray 9 is then slid onto the lower open hook of connector 8. Feed trays (baskets or tubes work equally as well) can either be lightweight mesh or solid plastic with drilled holes to allow moisture to drain. The process is repeated until all six bird leverage arms 5, feed tray holder caps 6, feed tray holder arms 7, feed tray connectors 8 and feed trays 9 with bails are connected.

The bird feeder 10 includes any type of small line 12 or small chain which is strong enough to hold the bird feeder apparatus 10, including without limitation monofilament and/or braided fishing line. The line 12 extends between and upper and lower ends, wherein the lower end is attached to the arm-holder fixture 1 by any expedient means, including without limitation the simplicity of a knot. The line 12's upper end is attached to some suitable overhead support 15 including without limitation a tree limb, stand, or about any structure which allows the bird feeder apparatus 10 including its trays 9 to hang freely above the ground. The overhead support structure 15 need not be perfectly stationary itself. Indeed in the case of a tree limb 15, the tree limb itself may sway in the wind or, alternatively, bounce and wobble around under the changing weight of the bird feeder 10 as birds perch and then fly-off.

Without excluding other suitable lines or cords, Fishing line has several preferred qualities including that it is flexible and can withstand a lot of twisting. That way, if there is no incorporation of a swivel device for the main support line 12, support line 12 nevertheless permits arms 5 to rotate about their respective arm-holders 2, 3 or 4 and the like. Incorporating a swivel means that matters of twist in the line 12 are resolved by the swivel. Alternatively, omitting a swivel means the that matters of twist in the line 12 probably have to be resolved by the line 12 itself, untwisting when there is too much twist, and even untwisting to a relaxed state if left un-bothered long enough by the birds and breezes. The main support line 12 can attach to the overhead support structure by any expedient means, including simply knotted loop 18 or the like.

Now to turn to system dynamics, the bird feeder apparatus 10 has a kinetic construction for which the uppermost attachment 18 by the knotted loop or the like serves as the "head" of the system, which alternatively is sometimes known as the vertex or pole (eg., a point of guidance or reference) of the system. In the prior art, when mobiles are constructed with objects hanging by strings from arms radiating from a common arm-holder to hold and the objects do not support additional portions of the mobile, then they (the prior art mobiles) have routinely been delicately balanced so that the objects hang at the same elevation. In contrast, the invention is nowhere near concerned with such balance.

Even assuming such perfect balance could be achieved, it would likely have to be achieved by carefully pouring in bird feed to all the trays until perfect levelness is achieved. Outdoors in the birds' world, that condition won't last after the first bird finds the bird feeder 10. The first bird's first visit unbalances the whole apparatus 10, spilling out some portions of the bird feed, flying off with other. Hence it is an aspect of the invention to be operative in highly unbalanced conditions. This aspect is achieved in the rugged construction of the bird feeder apparatus as described above.

Indeed it is another aspect of the design of the inventive bird feeder 10 that it tends to reject big birds. This effect is achieved by a combination of factors, namely the length of the arms 5 in combination with that is, the overall mass or inertia stored at the outer ends of the arms 5 as represented by trays 9.

Small birds perching on the trays 9 tend to cause motion in the system which, although wild, is recoverable. That is, if a small bird perches on a tray 9 and causes it to sink, the system will recover shortly and the tray 9 will soon begin to rise. Big birds, on the other hand, overwhelm the system because of their heavier weight, and have to drop off because the involved tray 9 sinks so fast it's like the bird landed in thin air. A diving board is designed to vault a bounding diver into the air:—try and bounce a piano on the diving board and just watch it smash through. The piano's weight overwhelmed the system. Same principle somewhat with the inventive bird feeder apparatus 10. Small birds are met by the system with dynamic vaulting that affords the birds a chance to feed, albeit during a wild ride. A large bird just sinks a tray 9 so fast that, again, it is nearly the same experience as if it tried to perch in thin air. A representative small bird includes without limitation a sparrow, or more accurately an English house sparrow.

Multiple small birds attacking one tray 9 at the same time can cause a comparable effect. However, such groups typically respond—not in unison onto another tray 9—but independently to different trays. Therefore, too many little birds at once on one tray causes an effect which tends to spray them off. Which is not bad result, because they return with a vengeance but spread around over several of the different trays 9.

FIG. 3 and FIG. 4 show the perpetual motion bird feeder 10 using four bird leverage arms 5. The unit is assembled the same as in FIG. 2 except the sprocket is replaced with a four-direction coupler 3. A hole is drilled on the center-top of the four-direction coupler 3. The bottom of the unit holder 1 is slid thru the drilled hold in the four-direction coupler 3 and braised to the bottom of four-direction coupler 3. The remainder of the bird feeder apparatus as shown by FIG. 4 is assembled the same as FIG. 2, and this applies as comparably as well to FIG. 6**.

FIG. 5 and FIG. 6 show the perpetual motion bird feeder with only two leverage arms 5, using a two-direction coupler 4 instead of the sprocket 2 in FIG. 1 and FIG. 2 or the four-direction coupler 3 in FIG. 3 and FIG. 4. A hole is drilled thru the center-top of the two-way coupler 4. The bottom of unit holder arm 1 is slid thru the hole drilled thru the two-direction coupler 4 and is braised to the bottom of the two-direction coupler 4. The rest of the unit is assembled as shown in FIG. 6 and as was comparably shown by either FIG. 2 or FIG. 4. String, fishing line or a small chain (strong enough to hold the bird feeder apparatus and feeding birds) can be used to attach the bird feeder apparatus to a tree limb, stand, or any structure which will allow the feeder apparatus to hang almost horizontal and rise, fall, rotate, pivot, swing, and sway while not impeding their movement.

Birds seem to enjoy to feed and to land on the perpetual motion bird feeders. Birds landing on or leaving any part of the unit causes the feeder to move. When several birds are feeding and leaving the unit at the same time the feeders rise, fall, rotate, roll, pivot, swing, and sway creating a carnival like atmosphere of action. The motion caused by birds landing on or leaving the leverage arms and feeder trays, and by any air movement even when the birds are not feeding adds a whole new dimension and beauty to the world of bird feeders. If anyone enjoys watching birds they will be thrilled to watch the antics these bird feeders cause. The participants seem to enjoy the movement of the feeders almost as much as the people watching.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A bird feeding apparatus comprising:
   a flexible suspension line extending between an upper attachment point and a spaced lower portion, wherein the upper attachment point is adapted for attaching to an overhead support;
   a coupler having a body and a given eye-fastener secured to the body, which given eye-fastener provides an eye for the flexible suspension line to attach to by the lower portion thereof, thereby providing a free swinging and/or spinning suspension of the coupler therefrom;
   a plurality of rigid arms, each extending from an origin secured in the body of the coupler to an outer end whereby said arms and coupler cooperatively define a rotational axis through said coupler relative to rotation of said arms thereabout, wherein said arms and coupler are arranged to form a structure which hangs statically from the suspension line such that in some instances the rotational axis extends through the upper attachment point, or in other instances hang in an angle of pitch such that the rotational axis is angularly divergent away from extending through the upper attachment point, or alternatively the arms and coupler can be in motion as by rotating about the rotational axis for both such cases as when the rotational axis extends through the upper attachment point and then also when not, or in addition be in motion as by pitching or otherwise the coupler can pendulously swing to and fro or sway about in circular or elliptical orbits on the suspension line below the upper attachment point, or else said motion can include some combination of hanging, rotating, pitching, swinging or swaying;
   a plurality of non-given eye-fasteners, each secured to a respective arm's outer end;
   a plurality of S-hooks, wherein the non-given eye-fasteners each provide an eye for accepting one part of the S-hooks to hook therein;
   a plurality of open bird-feed containers, each having a bail to be carried by, and said bails being correspondingly hooked into the other parts of the of the S-hooks, wherein if given bird weight application to any of the open containers or arms then in response the structure goes into motion and causes the open containers to variously rise, fall, pitch, roll, pivot, swing or sway or do combinations thereof, and which in consequence apparently provides a scene appearing to be one of a festive atmosphere for the amusement of bird watchers as well as a scene which even the birds seem to enjoy, and whereby said apparatus also has an attractive movement at times even without birds because of motion imposed by breezes.

2. The bird feeding apparatus of claim 1 wherein the plurality of arms comprises any configuration of two oppositely-spaced apart arms, four evenly-spaced apart arms, or six evenly-spaced arms.

3. The bird feeding apparatus of claim 1 wherein the open bird-feeding containers comprise any of trays or baskets.

4. The bird feeding apparatus of claim 1 wherein the suspension line comprises any of string, fishing line, or chain.

5. A method of bird feeding comprising the steps of:
   providing a flexible suspension line extending between an upper attachment point and a spaced lower connection point;

attaching the upper attachment point to an overhead support;

suspending a sprocket from the lower connection point;

providing a plurality of cantilevered arms that extend between origins secured in the sprocket and with spaced away outer ends;

said arms and sprocket cooperatively defining a rotational axis for said apparatus and being cooperatively arranged to form a sprocket-and-spoke structure which can statically hang from the suspension line such that in some instances the rotational axis extends through the upper attachment point, or in other instances hang in an angle of pitch such that the rotational axis is angularly divergent away from the upper attachment point, or alternatively the sprocket-and-spoke structure can be in motion as by rotating about the rotational axis for both such cases as when the rotational axis is extending through the upper attachment point and then also when not, or in addition be in motion as by pitching or otherwise the sprocket-and-spoke structure can pendulously swing to and fro or sway about in circular or elliptical orbits on the suspension line below the upper attachment point, or else said motion can include some combination of hanging, rotating, pitching, swinging or swaying;

providing each arm's outer end with a hook structure;

providing a plurality of open bird-feed containers with bails for carrying said containers;

hooking the bails of said open bird-feed containers from respective ones of the arm's outer-end hook-structures wherein if given bird weight application to any of the open bird-feed containers or arms then in response the sprocket-and-spoke structure goes into motion and causes the open bird-feed containers to variously rise, fall, pitch, roll, pivot, swing or sway or do combinations thereof, and which in consequence apparently provides a scene appearing to be one of a festive atmosphere for the amusement of bird watchers as well as a scene which even the birds seem to enjoy.

6. A method of feeding birds comprising the steps of:

providing a plurality of bird-feed containers comprising any of trays, baskets, or tubes, each which is carried by a bail;

providing a plurality of cantilevering arms radiating away from a common arm-holder to terminate in outer ends;

providing each outer end with a hook structure for hooking the respective bail of the corresponding bird-feed container in order to achieve suspension of the bird-feed containers;

providing a suspension line which extends between an upper attachment point adapted for attaching to an overhead support and a spaced lower attachment point adapted for attaching to the common arm-holder;

providing the suspension line with flexibility in combination with configuring the attachment between the arm-holder and suspension line such that the arm-holder has freedom to hang statically, rotate, pitch, or sway or swing in circular, elliptical or Figure-8 orbits and/or to do any combinations thereof;

wherein bird weight application to any of the bird-feed containers or arms propagates motion such that the bird-feed containers variously rise, fall, pitch, roll, pivot, swing or sway or do combinations thereof independently of one another.

\* \* \* \* \*